United States Patent Office 2,797,226
Patented June 25, 1957

2,797,226
PROCESS OF RESOLVING DL-ACYL TRYPTOPHAN COMPOUNDS AND PRODUCTS OBTAINED THEREBY

Gaston Amiard, Noisy-le-Sec, René Heymës, Romainville, and Léon Velluz, Paris, France, assignors to UCLAF, a French body corporate No Drawing. Application February 17, 1954, Serial No. 411,008

Claims priority, application France May 21, 1953

10 Claims. (Cl. 260—319)

The present invention relates to a process of resolving DL-acyl tryptophan compounds into their optically active components.

N-acylated tryptophan compounds of the following formula

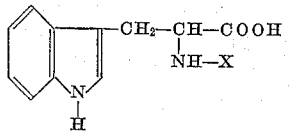

wherein X represents a carboxylic acid residue, are valuable therapeutic compounds, especially in the form of their water soluble salts. The N-acylated tryptophan may be used in the form of a sodium salt, at pH 7, as a supplement to the injectable proteolysate; the sodium salt of the acetyltryptophan being more soluble than the corresponding salt of tryptophan and also being neutral while the latter is alkaline. They are, furthermore, of importance as intermediate products in the synthesis of tryptophan and are readily converted thereinto by saponification. In such synthetic processes, said N-acyl tryptophan compounds are usually obtained in the DL-form, i. e., the racemic form, while the therapeutically effective N-acyl tryptophan compounds belong to the L-series. Likewise the essential amino acid tryptophan obtainable therefrom can be utilized by the organism only when made available in the L-form.

L-tryptophan cannot be produced by hydrolyzing natural proteins because the conventionally employed method of acid hydrolysis causes destruction of said amino acid. Its synthetic preparation, consequently, is of great importance since it is used, for instance, for supplementing injectable and orally administered protein hydrolysates. It also serves as supplement for proteins which are poor in or totally deficient of tryptophan, and, furthermore, as a starting material and reaction component in the synthesis of polypeptides containing said amino acid. To produce L-tryptophan requires resolution of the synthetically produced racemic intermediate reaction products, i. e., N-acyl-DL-tryptophan compounds, into their optically active components. The processes used heretofore for such resolution require much time, are quite expensive as they use costly reagents such as Brucine or other alkaloids and have other disadvantages.

It is one object of this invention to provide a simple, effective, and inexpensive method of resolving DL-acyl tryptophan compounds and of separating their enantiomorphic forms so as to produce the valuable L-acyl tryptophan compounds and, therefrom, by saponification, L-tryptophan.

Another object of this invention is to provide new and valuable salts of N-acyl-L-tryptophan compounds and of L-tryptophan, said salts being useful in the process of resolving DL-acyl tryptophan compounds as they are obtained in synthetic processes of producing tryptophan.

Other objects of this invention and advantageous features thereof will become apparent as the description proceeds.

The process, according to the present invention, involves dissolving N-acyl-DL-tryptophan compounds in water or in a water-miscible alcohol, adding L(+)-threo-(1-p-nitro phenyl)-2-amino propanediol-(1,3) thereto, and filtering the resulting precipitate. On acidifying the filtered precipitate, the salt is decomposed and the resolved N-acyl-L-tryptophan compound is obtained whereas acidifying the filtrate obtained after removing the insoluble L-form salt yields the N-acyl-D-tryptophan compound.

Thereby L(+)-threo-(1-p-nitro phenyl)-2-amino propanediol-(1,3) forms, with N-acyl-L-tryptophan compounds, salts which are very slightly soluble in water or in water-miscible alcohols, such as alcohol, while the corresponding salts of N-acyl-D-tryptophan compounds with said propanediol compound remain completely in solution under suitable reaction conditions.

The process of this invention has the particular advantage that use is made of the valueless L(+)-threo-(1-p-nitro phenyl)-2-amino propanediol-(1,3) which is obtained as a by-product in the chloramphenicol synthesis by resolving the corresponding racemic base mixture, for instance, according to the process disclosed by L. Velluz, G. Amiard, and R. Joly "Bulletin de la Société Chimique de France" 1953, page 342. Said L(+)-threo-(1-p-nitro phenyl)-2-amino propanediol-(1,3) corresponds to the following Formula II

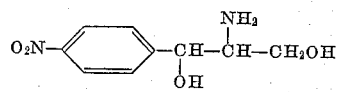

and has the following characteristic factors: Melting point (on the Maquenne block): 162–163° C. $[\alpha]_D$: $+28°\pm2°$ (c. 1% in N/20 hydrochloric acid).

Depending upon the nature of the acyl residue in said N-acyl-DL-tryptophan compounds and upon the solvent used, it is possible to completely separate the salts of said two enantiomorphic components by means of said above mentioned resolving agent and, starting with said separated salts of the enantiomorphic components, to produce the enantiomorphic compounds themselves by acidifying.

As stated above, resolution of N-acyl-DL-tryptophan compounds according to the present invention is effected by reacting L(+)-threo-(1-p-nitro phenyl)-2-amino propanediol-(1,3) with an N-acyl-DL-tryptophan compound in a suitable solvent. Thereby it is, of course, necessary to select such an acyl radical and such a solvent that only one of the two enantiomorphic compounds precipitates as a slightly soluble salt with said resolving agent. The salts of the two enantiomorphic components are separated on account of their differences in solubility, and the D- as well as the L-acyl tryptophan compounds are set free from said salts by simply acidifying the same. For instance, when working in water or in an organic solvent such as alcohol, the resolving agent yields with N-formyl-DL-tryptophan two salts. The salt of N-formyl-L-tryptophan is very little soluble in said solvents while, in contrast thereto, the salt of N-formyl-D-tryptophan is very soluble therein and remains in solution. The same applies to N-acetyl-DL-tryptophan.

DL-acyl tryptophan compounds to be resolved according to the present invention are obtained in the last before the final step of the process of synthesizing tryptophan. Said N-acyl-DL-tryptophan compounds can, of course, also be prepared by acylation of DL-tryptophan or by acylating the one or the other of the two optically active forms, the D-form or the L-form, of said amino acid under conditions whereby racemisation takes place.

For instance, D-tryptophan can be converted into N-acetyl-DL-tryptophan by a racemizing acylation in an acetic acid-acetic acid anhydride medium according to the process of J. J. Kolb and G. Toennies "Journal of Biological Chemistry" vol. 144, 1942, page 193.

The N-acyl-L-tryptophan compounds obtained according to the resolution process of this invention are used as such, as stated above, or for the production of L-tryptophan. The N-acyl-D-tryptophan compounds remaining after separation of the L-compounds are again returned into the resolution process since they can be directly or indirectly racemized. For instance, N-acetyl-D-tryptophan is directly converted into N-acetyl-DL-tryptophan according to the process of Du Vigneau and Sealock "Journal of Biological Chemistry" vol. 96, 1952, page 511. Said authors have used their process for converting the L-enantiomorphic form into the racemic DL-mixture by allowing said L-compound to remain in contact with acetic acid anhydride in sodium hydroxide medium. The D-form subjected to the same process yields also the DL-mixture.

Another indirect process of converting the optically active D-form of an N-acyl tryptophan compound into the racemic DL-mixture comprises first saponifying said N-acyl-D-tryptophan compound to D-tryptophan which can readily be acetylated, according to the above mentioned method of Kolb and Toennies, and thereby yields N-acetyl-DL-tryptophan. Said racemic mixture is then subjected to the resolution treatment according to the present invention.

It is possible to almost quantitatively resolve a racemic mixture of an N-acyl-DL-tryptophan compound into its L-component by alternately resolving the DL-mixture into its optically active components, and subsequently converting the separated D-form into the racemic mixture. The total yields of N-acyl-L-tryptophan achieved by this new resolving process by means of L(+)-threo-(1-p-nitro phenyl)-2-amino propanediol-(1,3) are usually between 80% and 90%.

The resolving agent used in this resolving process can also be recovered to about 90% by rendering alkaline the acid filtrates obtained after precipitation and filtration of the D- and L-acyl tryptophan compounds. The recovered resolving agent can again be used in this process.

It is understood, of course, that when working with DL-tryptophan for producing DL-acyl tryptophan compounds, all those acyl derivatives can be used, the L-form of which yields with L(+)-threo-(1-p-nitro phenyl)-2-amino propanediol-(1,3) a salt which is substantially insoluble or only slightly soluble in water or the organic solvents used. For economical reasons, however, the most advantageously used acyl derivatives are N-formyl tryptophan (Formula I, X: —OCH) and N-acetyl tryptophan (Formula I, X: —OC.CH₃). For the same reason, water is the most preferred solvent, although other solvents can also be used.

It was furthermore found that not only L(+)-threo-(1-p-nitro phenyl)-2-amino propanediol-(1,3) can be used as resolving agent but also other L(+)-threo-(1-phenyl)-2-amino propanediol-(1,3) compounds having in the phenyl ring a substituent in p-position. Compounds wherein said substituent in p-position is an alkyl thioether group and especially a lower alkyl thioether group, such as the methyl thioether group, have proved to be particularly suitable for the purpose of this invention. The methyl thioether compound corresponds to the following Formula III

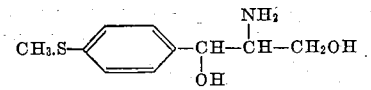

Said L(+)-threo-(1-p-methyl thiophenyl) - 2 - amino propanediol-(1,3) also forms salts with N-acyl-L-tryptophan compounds which are only slightly soluble in water. Said resolving agent is obtained according to the process described by A. Cutler, R. J. Stenger, and C. M. Suter in "Journal of the American Chemical Society" vol. 74, 1952, page 5475. The compound melts (on the Maquenne block) at 149° C.; [α]²⁰_D: +20°±1° (c. 1% in 95% ethanol).

It follows that suitable resolving agents useful in resolving N-acyl-DL-tryptophan compounds correspond to the following Formula IV

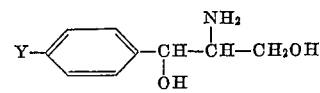

wherein Y is a suitable substituent and preferably a substituent selected from the group consisting of the nitro group, the mercaptan group and the alkyl mercaptan group.

The following examples serve to illustrate this invention without, however, limiting the same thereto.

*Example 1.—Resolution of N-formyl-DL-tryptophan*

10 g. of DL-tryptophan are added to a solution of 10 cc. of acetic acid anhydride and 20 cc. of formic acid. The temperature of the mixture is kept for 15 minutes at 70° C. whereafter the mixture is allowed to stand at room temperature for 1 hour. The resulting solution is concentrated by evaporation in a vacuum on a water bath to sirupy consistency. Said concentrate is cooled and seeeded. The resulting solidified crystalline mass is triturated with 50 cc. of water and the mixture is filtered. After drying, a slightly colored product is obtained which melts at 160–161° C. 10 g. are obtained corresponding to a yield of about 90%. Snyder and Werber (Journal of the American Chemical Society vol. 72, 1950, page 2962) states that the melting point of pure N-formyl-DL-tryptophan is 161–162.5° C.

4 g. of said N-formyl-DL-tryptophan, melting at 160–161° C. are dissolved on the water bath in 40 cc. of water in the presence of 4 g. of L(+)-threo-(1-p-nitro phenyl)-2-amino propanediol-(1,3) (excess of 10% over the theoretically required amount). The solution is cooled to room temperature, seeded, and allowed to stand for two hours. The resulting crystals of the precipitated salt of N-formyl-L-tryptophan with L(+)-threo-(1-p-nitro phenyl)-2-amino propanediol-(1,3) are filtered off and washed with a small amount of ice water.

Said new salt, after recrystallization from water, melts at 203–204° C. (on the Maquenne block), [α]²⁰_D: +26° ±2° (c. 1% in water).

The crude and moist salt is dissolved in 10 cc. of N-hydrochloric acid. Said solution subsequently solidifies to a crystalline mass of N-formyl-L-tryptophan which, after 30 minutes, is filtered off, washed with a small amount of cold water, and dried. 1.6 g. are obtained corresponding to a yield of 80%. Melting point: 162–163° C.; [α]²⁰_D: +48°±2° (c. 1% in 95% ethanol).

The N-formyl-L-tryptophan has not yet been described. It can be recrystallized in water. An hydrate is then obtained. Melting point: 132–133° C.; [α]_D²⁰ = +48°±2° (c. 1% in 95% ethanol).

Acidifying the aqueous mother liquor obtained after filtering off the salt of N-formyl-L-tryptophan with L(+)-threo - (1 - p - nitro - phenyl) - 2 - amino - propanediol-(1,3) yields N-formyl-D- tryptophan contaminated by some racemate. It is saponified as follows:

1 g. of N-formyl-D-tryptophan, contaminated with a small quantity of racemate, and 10 cc. of N-hydrochloric acid are heated under reflux for two hours. It is cooled, separated by filtration from the unsaponified fraction and made alkaline by means of a caustic soda solution. After a treatment with charcoal, it is acidified with acetic acid. The mixture D+DL-tryptophan precipitates. The resulting mixture of D- and DL-tryptophan is acetylated under conditions whereby the D-form is converted into the DL-mixture. [Cf. J. R. Spies et D. C. Chambers, Anal. Chem., 21, 1249 (1949).] Said racemate can again be resolved in the manner described above.

The resolving agent is finally recovered from the hydrochloric acid filtrate obtained on acidifying the salt solution of the L- as well as the D-formyl tryptophan, by rendering the same alkaline by means of a caustic soda solution, the base is allowed to crystallize for one hour at 10° C., filtered off, and dried at 70° C. The yield achieved on said recovery is about 90%. The recovered L(+) - threo - (1 - p - nitro - phenyl) - 2 - amino propanediol-(1,3), after purification, can directly be employed for further resolving.

N-formyl-L-tryptophan yields L-tryptophan in an excellent yield by hydrochloric acid hydrolysis. The conditions under which this hydrolysis is made are identical with those described above for the N-formyl-D-tryptophan, contaminated with a small quantity of racemate. L-tryptophan obtained in this manner has an optical rotatory power of $[\alpha]_D$: $-30°\pm2°$ (c. 1% in water).

*Example 2.—Resolution of N-acetyl-DL-tryptophan*

10 g. of N-acetyl-DL-tryptophan obtained according to the synthetic process described by Snyder and Smith in "Journal of the American Chemical Society" vol. 66, 1944, page 350, are added to 150 cc. of water while heating at 80° C. 9.5 g. of L(+)-threo-(1-p-nitro phenyl)-2-amino propanediol-(1,3), i. e., an excess of 10%, are added thereto. The warm mixture is cooled, allowed to stand at room temperature for half an hour and filtered off. The resulting crude salt is readily purified by recrystallization from water. The new compound melts on the Maquenne block at 231–232° C.; $[\alpha]_D^{20}$: $+26°\pm2°$ (c. 1% in water).

For setting free therefrom N-acetyl-L-tryptophan, the crude salt is directly used after filtering off and washing with a small amount of ice water. It is treated with 50 cc. of N/2 hydrochloric acid whereby first solution takes place. Subsequently N-acetyl-L-tryptophan crystallizes from said solution, it is filtered off, washed with ice water, and dried. 4.55 g. of N-acetyl-L-tryptophan, corresponding to a yield of 90%, are obtained. The compound melts at 185–187° C.; $[\alpha]_D^{15}$: $+25°\pm2°$ (c. 1% in 95% alcohol).

The mother liquors remaining after filtering off the crystallized salt of N-acetyl-L-tryptophan with the resolving agent are acidified with 3 cc. of concentrated hydrochloric acid and the crystalline precipitate is, after crystallisation, filtered off and washed. Thereby 4.5 g. to 4.7 g. of N-acetyl-D-tryptophan are obtained. The yield is about 92%. The compound melts at 185–187° C.; $[\alpha]_D^{15}$: $-25°\pm2°$ (c. 1% in 95% alcohol).

The resolving agent can be readily recovered from the hydrochloric acid filtrates after removing the precipitated N-acetyl-D- or -L-tryptophans, respectively. Said recovery is effected by rendering said filtrates alkaline and filtering the precipitated resolving agent.

N-acetyl-L-tryptophan is readily saponified to L-tryptophan by proceeding according to the reaction described, for instance, by Shabica and Tishler in "Journal of the American Chemical Society," vol. 71, 1949, page 3251.

N-acetyl-D-tryptophan can be converted into N-acetyl-DL-tryptophan by treating said compound in sodium hydroxide medium with acetic acid anhydride according to the method of Du Vigneaud and Sealock described in "Journal of Biological Chemistry" vol. 96, 1932, page 511.

*Example 3.—Resolution of N-formyl-DL-tryptophan*

2 g. of N-formyl-DL-tryptophan obtained according to Example 1, are dissolved at 70° C. in 25 cc. of water in the presence of 2 g. of L(+)-threo-(1-p-methyl thiophenyl)-2-amino propanediol-(1,3), (1.84 g. of said base are theoretically required). The salt of N-formyl-L-tryptophan with said base starts to precipitate and crystallize while the solution is hot. The mixture is allowed to cool to 25° C. within one hour, the crystals are filtered off and washed with a small amount of ice water. The salt is recrystallized from water and melts on the Maquenne block at 205° C.$\pm2°$ C.; $[\alpha]_D^{20}$: $+21°\pm1°$ (c. 1% in 50% ethanol).

The crude, moist product obtained on filtering off is dissolved in 10 cc. of N hydrochloric acid. Solution takes place quite rapidly whereafter N-formyl-L-tryptophan begins to precipitate and crystallizes. The mixture is allowed to stand for 2 hours, cooled with ice, filtered off, washed with a small amount of ice water and dried. 0.81 g. of N-formyl-L-tryptophan, corresponding to a yield of 81% are obtained. Said compound melts on the Maquenne block at 162° C.; $[\alpha]_D^{20}$: $+45°\pm1°$ (c. 1% in 95% alcohol). On recrystallization, the product is optically pure: $[\alpha]_D^{20}=+48°\pm1$ (c.=1%, in 95% ethanol).

The aqueous filtrate obtained after removing by filtering off the salt of N-formyl-L-tryptophan with L(+)-threo - (1 - p - methyl thiophenyl) - 2 - amino propanediol-(1,3), is acidified with 1 cc. of concentrated hydrochloric acid and the acidified solution is allowed to stand overnight. 0.6 g. of optically pure N-formyl-D-tryptophan corresponding to a yield of 60% are obtained. The water-free product has a specific rotatory power of $-48°\pm1°$ (c. 1% in 95% ethanol).

The various hydrochloric acid mother liquors obtained on decomposing the salts of L- and D-formyl tryptophan, respectively, and filtering off the free L-formyl tryptophan or the free D-formyl tryptophan, respectively, are rendered alkaline by the addition of 5 cc. of commercial ammonia. The alkaline solutions are allowed to stand for 1 hour. 1.8 g. of L(+)-threo-(1-p-methyl thiophenyl)2-amino propanediol-(1,3) precipitate and are collected. The yield on recovery is about 90% of the amount of base employed originally.

*Example 4.—Resolution of N-acetyl-DL-tryptophan*

9 g. (theoretically required: 8.65 g.) of the dextrorotatory L(+)-threo-(1-p-methyl thiophenyl)-2-amino propanediol-(1,3) are added at 70° C. to 150 cc. of water whereby, however, no complete solution is achieved. While keeping the temperature at 70° C., 10 g. of N-acetyl-DL-tryptophan are added to said suspension. The mixture rapidly dissolves. Almost immediately after solution is complete, crystallisation of the salt of said base with N-acetyl-L-tryptophan sets in. The mixture is allowed to cool to 25° C. for 1 hour. The precipitate is filtered off and is washed three times, each time with 5 cc. of water. On recrystallisation from 50% alcohol, the resulting salt of L(+)-threo-(1-p-methyl thiophenyl)-2-amino propanediol-(1,3) with N-acetyl-L-tryptophan melts on the block at 225° C.$\pm2°$ C.; $[\alpha]_D^{20}$: $+25°\pm1°$ (c. 1% in 50% alcohol).

The crude, still somewhat moist salt, directly after its separation by filtering off is added to 30 cc. of N hydrochloric acid. Solution takes place followed by precipitation of N-acetyl-L-tryptophan. The mixture is cooled with ice for 30 minutes, filtered off, washed with a small amount of water, and dried. 4.75 g. of optically pure N-acetyl-L-tryptophan, corresponding to a yield of 95%, are obtained. Melting point: 185–187° C.; $[\alpha]_D^{20}$: $+25°\pm1°$ (c. 1% in 95% alcohol).

The aqueous solution resulting after filtering off the salt of N-acetyl-L-tryptophan with L(+)-threo-(1-p-methyl thiophenyl)-2-amino propanediol-(1,3) is acidified with 3 cc. of concentrated hydrochloric acid whereby N-acetyl-D-tryptophan precipitates. The mixture is cooled in ice for 30 minutes, filtered off, washed with water, and dried at 70° C. 4.6 g. of optically pure N-acetyl-D-tryptophan, corresponding to a yield of 92%, are obtained. Melting point: 185–187° C.; $[\alpha]_D^{20}$: $-25°\pm1°$ (c. 1% in 95% ethanol).

The resolving agent is recovered, as described in Example 3, by rendering alkaline the hydrochloric acid filtrates obtained after removing N-acetyl-D-tryptophan and N-acetyl-L-tryptophan, and filtering off the precipitated base. The yield of resolving agent on recovery is about 84%.

*Example 5.—Resolution of N-propionyl-DL-tryptophan*

This product is prepared as follows:

20 g. of tryptophan are dissolved in 400 cc. of N caustic soda. It is cooled down to 10° C. and 50 cc. of propionic anhydride are added during five minutes with vigorous stirring. The temperature rises to 20° C. when stirring is recommended for 15 minutes. The mixture is acidified with 40 cc. of concentrated hydrochloric acid and seeded. One hour later, the product is filtered off and washed with water. The wet product is recrystallized from 100 cc. of 50% methanol. A first crop of 20 g. of N-propionyl-DL-tryptophan is thus obtained: Melting point 166–167° C.

2.6 g. of N-propionyl-DL-tryptophan and 2.2 g. of L(+)-threo-(1-p-methyl thiophenyl)-2-amino propanediol-(1,3) (theoretically required: 2.13 g.) are dissolved in 35 cc. of water at 80° C. On cooling, the salt of N-propionyl-L-tryptophan with L(+)-threo-(1-p-methyl thiophenyl)-2-amino propanediol-(1,3) precipitates in the form of an oil which subsequently becomes crystalline. After standing for 4 to 5 hours at 25° C., the mixture is filtered off and washed with water. On recrystallization from water, the pure salt is obtained, which melts on the block at 160° C.±2° C.; $[\alpha]_D$: +36.5°±1° (c. 1% in 50% ethanol).

Proceeding and treating the various mother liquors and filtrates in the same manner as described in the preceding examples produces the following compounds:

(a) 1.25 g. of N-propionyl-L-tryptophan. Yield: about 96%. The crude compound melts at 174–175° C.; $[\alpha]_D^{20}$: +21°±1° (c. 1% in 95% ethanol). The pure compound, on recrystallization from 50% methanol melts at 179–180° C.; $[\alpha]_D^{20}$: +29°±1° (c. 1% in 95% ethanol).

(b) 1.2 g. of N-propionyl-D-tryptophan, corresponding to a yield of 92%. The crude compound melts at 172–174° C., $[\alpha]_D$: −21°±1° (c. 1% in 95% ethanol). The optically pure compound is obtained on recrystallization from 50% alcohol. The yield on resolution according to the present invention is about 75% of each of the two enantiomorphic compounds which are recovered in a state perfectly free from racemate.

(c) 1.9 g. of L(+)-threo-(1-p-methyl thiophenyl)-2-amino propanediol-(1,3) are recovered as described above. They can again be used for resolving fresh racemate.

Other N-acyl-DL-tryptophan compounds than those mentioned in the examples and especially other N-lower aliphatic acyl-DL-tryptophan compounds can be used in the same manner as starting materials.

Of course, many changes and variations in the starting materials and the solvents used, in the reaction conditions, duration and temperature, in the recovery of the precipitated and crystallized salts of the optically active components of the racemate and their recrystallization and purification, in the decomposition of said salts to produce the optically active N-acylated tryptophan compounds, in the saponification of the optically active acylated tryptophan compounds and the recovery and purification of the optically pure tryptophans, in the recovery of the resolving agent, in the conversion of D-tryotophan or N-acyl-D-tryptophan compounds into the corresponding DL-racemates, and the like, may be made by those skilled in the art in accordance with the principles set forth herein and in the claims annexed hereto.

We claim:

1. In a process of resolving N-acetyl-DL-tryptophan, the steps comprising adding to N-acetyl-DL-tryptophan in warm water L(+)-threo-(1-p-nitro phenyl)-2-amino propanediol-(1,3) in an amount slightly in excess of the equimolecular amount, cooling said solution to room temperature to complete precipitation of the difficultly water-soluble salt of N-acetyl-L-tryptophan with L(+)-threo-(1-p-nitro phenyl)-2-amino propanediol-(1,3) and separating said salt from the mother liquor.

2. In a process of resolving N-acetyl-DL-tryptophan, the steps comprising adding to N-acetyl-DL-tryptophan in warm water L(+)-threo-(1-p-nitro phenyl)-2-amino propanediol-(1,3) in an amount slightly in excess of the equimolecular amount, cooling said solution to room temperature to complete precipitation of the difficultly water-soluble salt of N-acetyl-L-tryptophan with L(+)-threo-(1-p-nitro phenyl)-2-amino propanediol-(1,3), separating said salt from the mother liquor, and treating the salt with an acid to decompose it to substantially optically pure N-acetyl-L-tryptophan.

3. In a process of resolving N-formyl-DL-tryptophan, the steps comprising adding to N-formyl-DL-tryptophan in warm water L(+)-threo-(1-p-nitro phenyl)-2-amino propanediol-(1,3) in an amount slightly in excess of the equimolecular amount, cooling said solution to room temperature to complete precipitation of the difficultly water-soluble salt of N-formyl-L-tryptophan with L(+)-threo-(1-p-nitro phenyl)-2-amino propanediol-(1,3), and separating said salt from the mother liquor.

4. In a process of resolving N-formyl-DL-tryptophan, the steps comprising adding to N-formyl-DL-tryptophan in warm water L(+)-threo-(1-p-nitro phenyl)-2-amino propanediol-(1,3) in an amount slightly in excess of the equimolecular amount, cooling said solution to room temperature to complete precipitation of the difficultly water-soluble salt of N-formyl-L-tryptophan with L(+)-threo-(1-p-nitro phenyl)-2-amino propanediol-(1,3), separating said salt from the mother liquor, and treating the salt with an acid to decompose it to substantially optically pure N-formyl-L-tryptophan.

5. In a process of resolving N-acyl-DL-tryptophan compounds, the steps comprising adding to an N-lower aliphatic acyl-DL-tryptophan compound in a warm solvent L(+)-threo-(1-p-nitro phenyl)-2-amino propanediol-(1,3) in an amount slightly in excess of the equimolecular amount, cooling said solution to complete precipitation of the difficultly soluble salt of said N-acyl-L-tryptophan compound with said amino propanediol compound, and separating said salt from the mother liquor.

6. In a process of resolving N-lower aliphatic acyl-DL-tryptophan compounds, the steps comprising adding to an N-lower aliphatic acyl-DL-tryptophan compound in a warm solvent L(+)-threo-(1-p-nitro phenyl)-2-amino propanediol-(1,3) in an amount slightly in excess of the equimolecular amount, cooling said solution to complete precipitation of the difficultly soluble salt of N-acyl-L-tryptophan compound with said amino propanediol compound, separating said salt from the mother liquor, and treating the salt with an acid to decompose it to the substantially optically pure N-lower aliphatic acyl-L-tryptophan compound.

7. The salt of N-acetyl-L-tryptophan with L(+)-threo-(1-p-nitro phenyl)-2-amino propanediol-(1,3).

8. The salt of N-formyl-L-tryptophan with L(+)-threo-(1-p-nitro phenyl)-2-amino propanediol-(1,3).

9. The salt of an N-lower aliphatic acyl-L-tryptophan compound with L(+)-(1-p-nitro phenyl)-2-amino propanediol-(1,3).

10. In a process of resolving N-lower aliphatic acyl-DL-tryptophan compounds, the steps comprising adding to an N-lower aliphatic acyl-DL-tryptophan compound in a warm solvent L(+)-threo-(1-p-nitro phenyl)-2-amino propanediol-(1,3) in an amount slightly in excess of the equimolecular amount, cooling said solution to complete precipitation of the difficultly soluble salt of said N-acyl-L-tryptophan compound with said amino propanediol compound, separating said salt from the mother liquor, treating the salt with an acid to decompose the same to the substantially optically pure N-lower aliphatic acyl-L-tryptophan compound, acidifying the mother liquors obtained on separating the precipitated salt of said N-lower aliphatic acyl-L-tryptophan with said amino propanediol compound, and separating the precipitated substantially optically pure N-lower aliphatic acyl-D-tryptophan from the acidified mother liquors.

References Cited in the file of this patent

UNITED STATES PATENTS

| | | |
|---|---|---|
| 2,071,327 | Bley | Feb. 23, 1937 |
| 2,483,884 | Crooks et al. | Oct. 4, 1949 |
| 2,545,094 | Long et al. | Mar. 13, 1951 |
| 2,583,010 | Opie et al. | Jan. 22, 1952 |
| 2,680,135 | Gregory | June 1, 1954 |

OTHER REFERENCES

Stereochemistry, Barnett Pittman and Sons, London, pp. 19–22.

Org. Chem., Karrer, 2nd Eng. ed., Esevier Book Co., New York (1946), pp. 98–99.

J. Am. Chem. Soc., vol. 71, page 3251 (1949).

Jr. Org. Chem, vol. 19, page 851 (1954).

Helv. Chim Acta, vol. 31, pp. 1908–14 (1948).